Sept. 24, 1963   M. RANDALL   3,105,021
FLASH STILL
Filed Aug. 1, 1960

INVENTOR.
Max Randall
BY
ATTORNEY

United States Patent Office

3,105,021
Patented Sept. 24, 1963

3,105,021
FLASH STILL
Max Randall, 10 Vincent Road, Spring Valley, N.Y.
Filed Aug. 1, 1960, Ser. No. 46,696
2 Claims. (Cl. 202—237)

The present invention relates to a flash still and more particularly to a flash still adapted to recover pure solvents from contaminated solvents.

In the field of electronics it is frequently necessary to degrease and thoroughly clean component parts such as printed circuits, relays, and switching devices. These parts are generally cleaned by bathing them with suitable solvents in a processing tank. The solvents in the processing tank become contaminated by rosins and other materials and have to be replaced by pure solvents. Naturally if the contaminated solvents are merely discarded the processing would become a very expensive procedure.

The solvents used are blends each constituent of which has a different boiling point and latent heat of vaporization. If the solvent blends were distilled in an ordinary still, the components would fractionate out, thereby destroying the composition of the blend. Further, ordinary distillation can create a fire hazard when a flammable material is separated from the blend. For these reasons, the solvent blend must be flashed. Flashing produces an instantaneous change from liquid to vapor of all the components of the blend thus preserving the original composition of the solvent blend.

The rosin fluxes are solids that soften at elevated temperatures which would tend to foul the surfaces of a conventional still if complete dry distillation would occur. With this type of impurity regular distillation would not be practical since it would be necessary to suspend operation periodically for scraping and cleaning which would significantly increase the cost of recovering the solvents.

It is, therefore, an object of the present invention to provide a flash still adapted to overcome the foregoing difficulties.

It is another object of the present invention to provide a still which will receive blends of contaminated solvents and which will recover the pure solvents therefrom in its original blended condition for direct reuse.

It is a further object of the present invention to provide a flash still which will acomplish the foregoing yet be economical to produce for commercial use.

Figure 1:
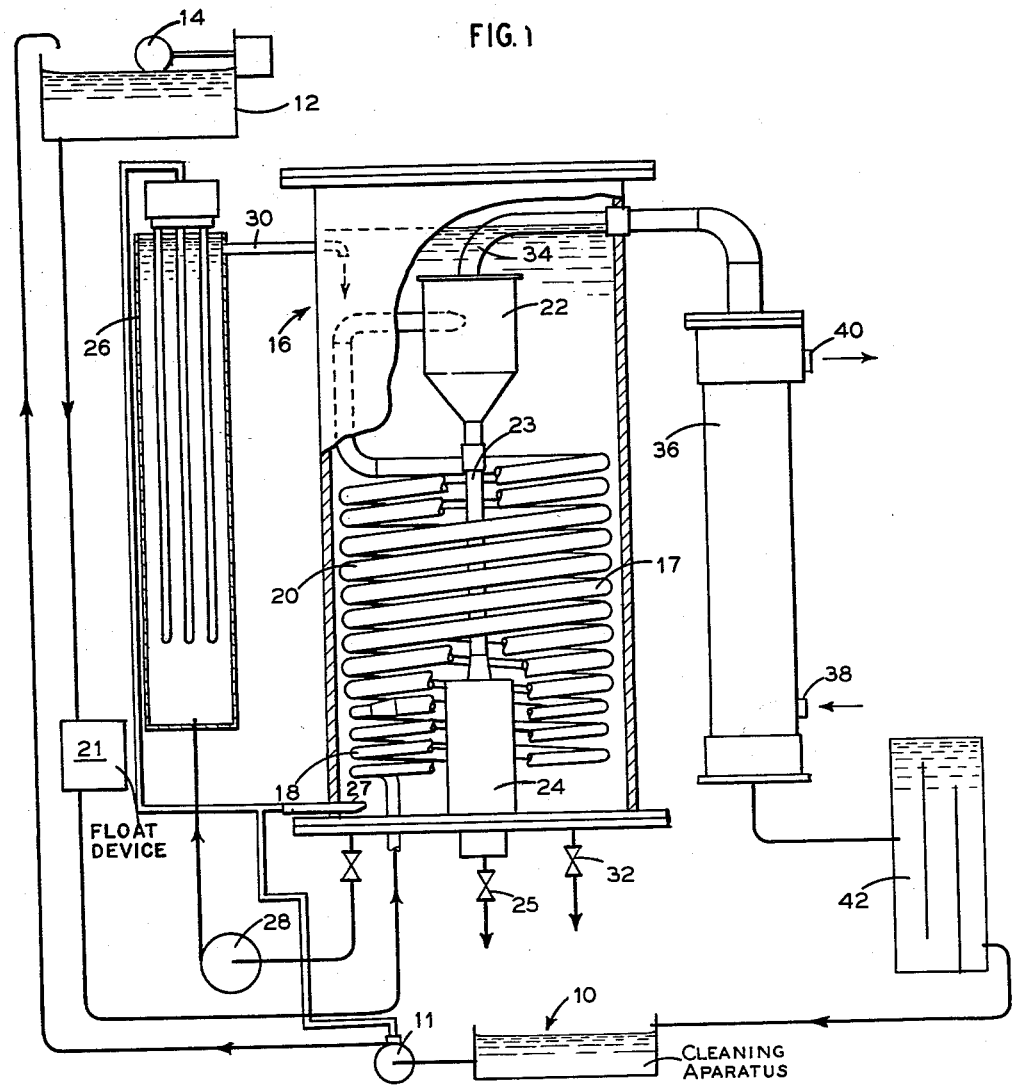
Figure 2:
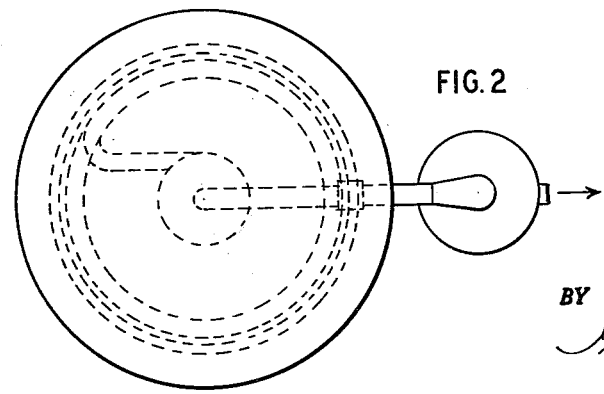

Additional features and advantages of the present invention will be apparent from the following description and drawing in which:

FIG. 1 is a partially schematic front view of the flash still of the present invention; and FIG. 2 is a plan view of the flash still shown in FIG. 1.

The flash still described herein is particularly useful in the recovery of solvent blends of the fluorinated hydrocarbon and chlorinated hydrocarbon types, such as trichloromonofluoromethane and trichlorotrifluoroethane with anhydrous alcohol. These blends of solvents, among others, are particularly suited to the cleaning of electronic parts.

Referring now to the drawing, there is shown a processing tank 10 through which the parts to be cleaned are passed in any suitable manner, not shown. The tank 10 contains a bath of a solvent blend of the type described. During the processing impurities are removed from the electronic parts and remain in the solvent blend thereby contaminating the same. The contaminated solvents are delivered by a transfer pump 11 into a gravity tank 12. The level of contaminated solvent is kept constant by means of an electrical float device 14 that controls the operation of the pump 11.

The contaminated solvent is released from the gravity tank 12 and flows to a distillation vessel indicated generally by reference numeral 16. The distillation vessel 16 has a corrosion-resistant coil 17 including a preheating section 18 and a flashing section 20. As the contaminated solvent rises up through the coil it is first preheated and then flashed into vapors. The coil in the flashing section 20 is of a larger diameter than that in the preheating section 18 since the solvents will expand as they are vaporized. The feed to the coil 17 is controlled by means of a float device 21 which acts to maintain a constant level of liquid in the coil.

The solvent vapors and the entrained insoluble contaminants travel through the coil and enter a cyclone separator 22. In the cyclone separator 22 the rosin fluxes and solid matter are disengaged from the solvent vapors. The rosin fluxes flow out of the bottom of the cyclone separator 22 through a conduit 23 which leads to a catch-pot 24. The fluxes are removed periodically at a drain 25.

The coil 17 and the cyclone separator 22 and the catch-pot 24 are immersed in a hot oil bath. The hot oil bath serves two functions. First, it heats the coil to vaporize the solvents. Secondly, it keeps the rosin fluxes heated to liquid condition so that they will flow out of the drain 25 and will not accumulate in and foul any surface with which they come into contact.

The oil bath, which is provided with a temperature control 27, is kept circulating between the distillation vessel 16 and a heater, such as an electrical immersion heater 26 connected to the temperature control 27. The oil is delivered to the heater 26 from the distillation vessel 16 by means of a pump 28. After passing through the heater 26 where it is brought to the desired temperature the oil is returned to the distillation vessel through a pipe connection 30. To prevent pumping of solvent to a cold distillation vessel, the transfer pump 11 is preferably interlocked with the oil temperature control 27 so that the transfer pump 11 will not operate until the oil has reached the desired temperature. A drain 32 is provided at the bottom of the distillation vessel 16 through which the oil may be removed when required.

While it is preferred to use an electrically heated oil jacket operated at atmospheric pressure to effect the heating as described above at temperatures of from 200–300° F. for safety and convenience, other means of heating can also be used, such as a steam jacket or a water jacket operated under pressure.

The pure solvent vapors rise up through a pipe connection 34 and are delivered to a water-cooled shell and tube condenser 36 where they are condensed and further sub-cooled to approximate room temperature. Cool water is passed into the condenser 36 at 38 and is removed at 40. The solvent now enters a dehydrating chamber 42 which contains a drying agent to remove the water from the solvent blend. Crystalline alumino-silicates may be used to effect such drying. The pure, cool water-free solvent can now be returned to the processing tank 10 for reuse.

It has been shown, then, that the flash still of this invention will recover pure solvents from solvents contaminated with rosins or other materials that would tend to foul the surfaces of conventional stills.

While a specific embodiment of the invention has been shown and described in detail to illustrate the application of the invention, it will be understood that the invention may be embodied otherwise without departing from such principles.

What is claimed is:
1. A flash still for recovery of pure solvents from solvents contaminated with a solid liquifiable material, said still comprising a heater, a contaminated solvent tank, a transfer pump to deliver the contaminated solvents to the contaminated solvent tank, a distillation vessel connected to receive material from said contaminated solvent tank and containing a temperature-controlled hot liquid bath in which are located a cyclone separator, a coil with a preheating section and a flashing section of larger diameter than said preheating section to vaporize the contaminated solvent and carry the vapors thereof to said cyclone separator, said cyclone separator acting to separate purified solvent vapor from contaminating materials, and a catch-pot to receive said contaminating materials from said cyclone separator, the temperature of said hot bath being maintained by circulating the liquid between the distillation vessel and the said heater, said transfer pump being interlocked with an oil temperature measuring means so that the transfer pump will not operate until the oil has reached the desired temperature, said hot bath acting to keep said contaminating materials in liquid condition for easy removal, and a condenser connected to receive solvent vapors from said cyclone separator and acting to liquify said purified solvent vapor.

2. A flash still for recovery of pure solvents from solvents contaminated with a solid liquifiable material, said still comprising a heater, a contaminated solvent gravity tank, a transfer pump to deliver the contaminated solvents to the contaminated solvent tank, a float valve to keep the level of contaminated solvent constant in the said tank, a distillation vessel connected to receive material from said contaminated solvent tank and containing a temperature-controlled hot oil bath in which are located a cyclone separator, a coil with a preheating section and a flashing section of larger diameter than the preheating section, said coil acting to vaporize the contaminated solvent and carry the vapors thereof to said cyclone separator, said cyclone separator acting to separate purified solvent vapor from contaminating materials, and a catch-pot to receive said contaminating materials from said cyclone separator, the temperature of said hot bath being maintained by circulating the oil between the distillation vessel and the said heater, said transfer pump being interlocked with an oil temperature measuring means so that the transfer pump will not operate until the oil has reached the desired temperature, said hot bath acting to keep said contaminating materials in liquid condition for easy removal, a shell and tube condenser connected to receive solvent vapors from said cyclone separator and acting to liquify and subcool said purified solvent vapor to approximate room temperature, and dehydration means connected to receive purified solvent from the condenser and to remove water from the purified solvent.

References Cited in the file of this patent

UNITED STATES PATENTS

| | | |
|---|---|---|
| 264,208 | Walker | Sept. 12, 1882 |
| 1,149,711 | Beers | Aug. 10, 1915 |
| 1,990,831 | Lea | Feb. 12, 1935 |
| 2,441,361 | Kirgan | May 11, 1948 |
| 2,446,880 | Kleinschmidt | Aug. 10, 1948 |
| 2,451,668 | Egger et al. | Oct. 19, 1948 |
| 2,476,280 | Bragg | July 19, 1949 |
| 2,484,788 | Gunther | Oct. 11, 1949 |
| 2,614,971 | Burton | Oct. 21, 1952 |

FOREIGN PATENTS

| | | |
|---|---|---|
| 805,747 | Great Britain | Dec. 10, 1958 |

OTHER REFERENCES

"Instruments and Process Control," N.Y. State Vocational and Practical Arts Assn., 1945, pp. 155–185.